United States Patent [19]
DiGiulio et al.

[11] Patent Number: 4,931,712
[45] Date of Patent: Jun. 5, 1990

[54] MULTIPLE CHANNEL SERVO CONFIGURATION

[75] Inventors: Peter C. DiGiulio, Bridgeport; Norman J. Bergman, Danbury; Edilberto I. Salazar, Brookfield, all of Conn.

[73] Assignee: Pitney Bowes Inc., Stamford, Conn.

[21] Appl. No.: 291,474

[22] Filed: Dec. 28, 1988

[51] Int. Cl.$^5$ .............................................. G05B 11/32
[52] U.S. Cl. .................................... 318/625; 318/562; 318/564; 318/786; 364/724.03
[58] Field of Search ............... 318/625, 562, 564, 786; 364/724

[56] References Cited

U.S. PATENT DOCUMENTS

| | | | |
|---|---|---|---|
| 4,356,558 | 10/1982 | Owen | 364/724 |
| 4,456,863 | 6/1984 | Matusek | 318/572 |
| 4,464,615 | 8/1984 | Rodi | 318/625 |
| 4,764,714 | 8/1988 | Alley et al. | 318/786 |

Primary Examiner—William M. Shoop, Jr.
Assistant Examiner—Saul M. Bergmann

Attorney, Agent, or Firm—Charles G. Parks, Jr.; David E. Pitchenik; Melvin J. Scolnick

[57] ABSTRACT

The multiple channel servo system engages in bus communication with a micro-controller, motor driver for driving a plurality of motors and motor servo for providing servo information for selected ones of the motors. The micro-controller generates respective motion command profile information for each of the selected motors. RAM is provided for receiving and storing the motion command profile information from the micro-controller for the selected motors. The servo system sequentially compares the respective servo information with the respective motor command information and generating respective motor control information for the respective motor for causing the motor driver to cause the respective motor to closely track the respective motor command profile. RAM memory is also provided for receiving and storing microcode for each of the selected motors. The arithmetic logic unit (ALU) of the servo system can be selectively configurable for the selected motors in accordance with the microcode such that the arithmetic logic unit can be reconfigured to sequentially generate respective motor control information for the selected motors.

12 Claims, 4 Drawing Sheets

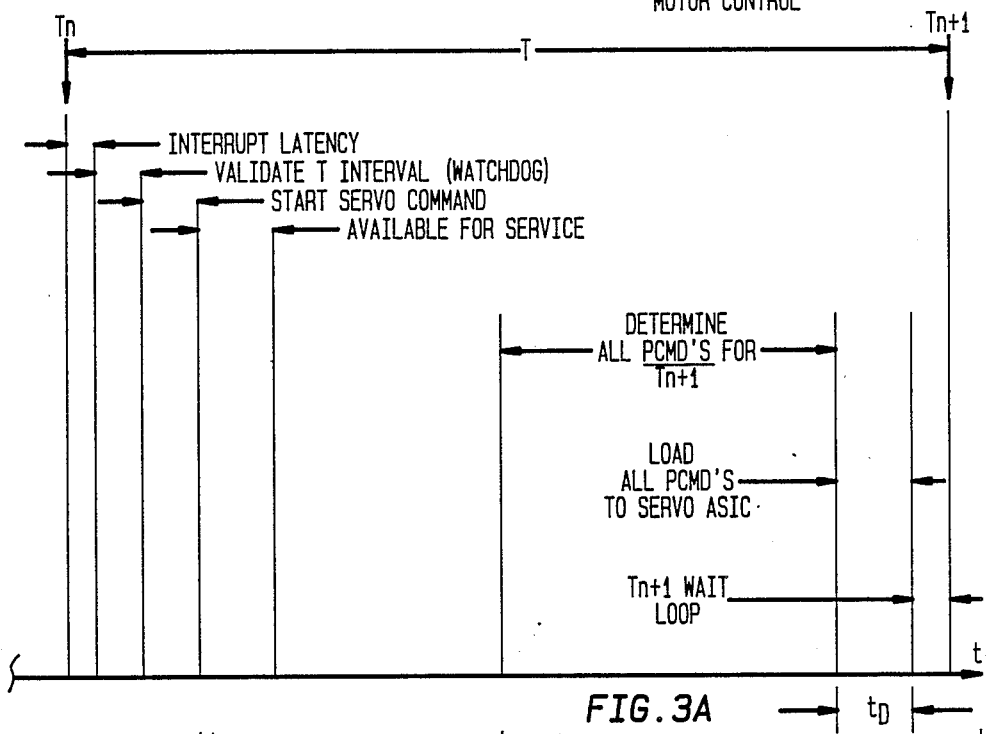
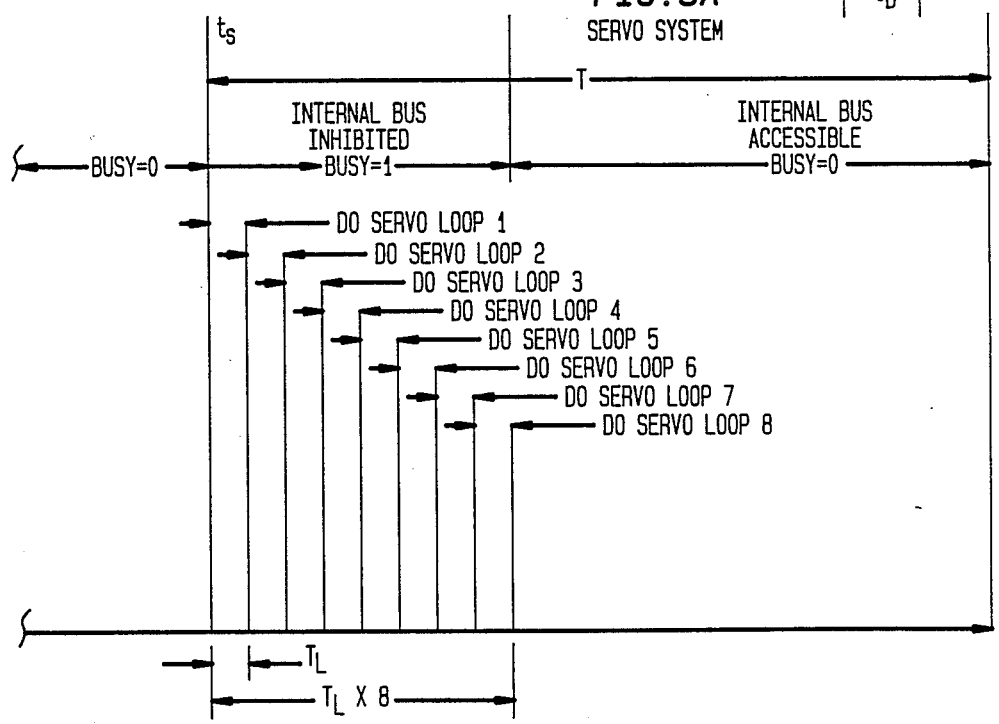

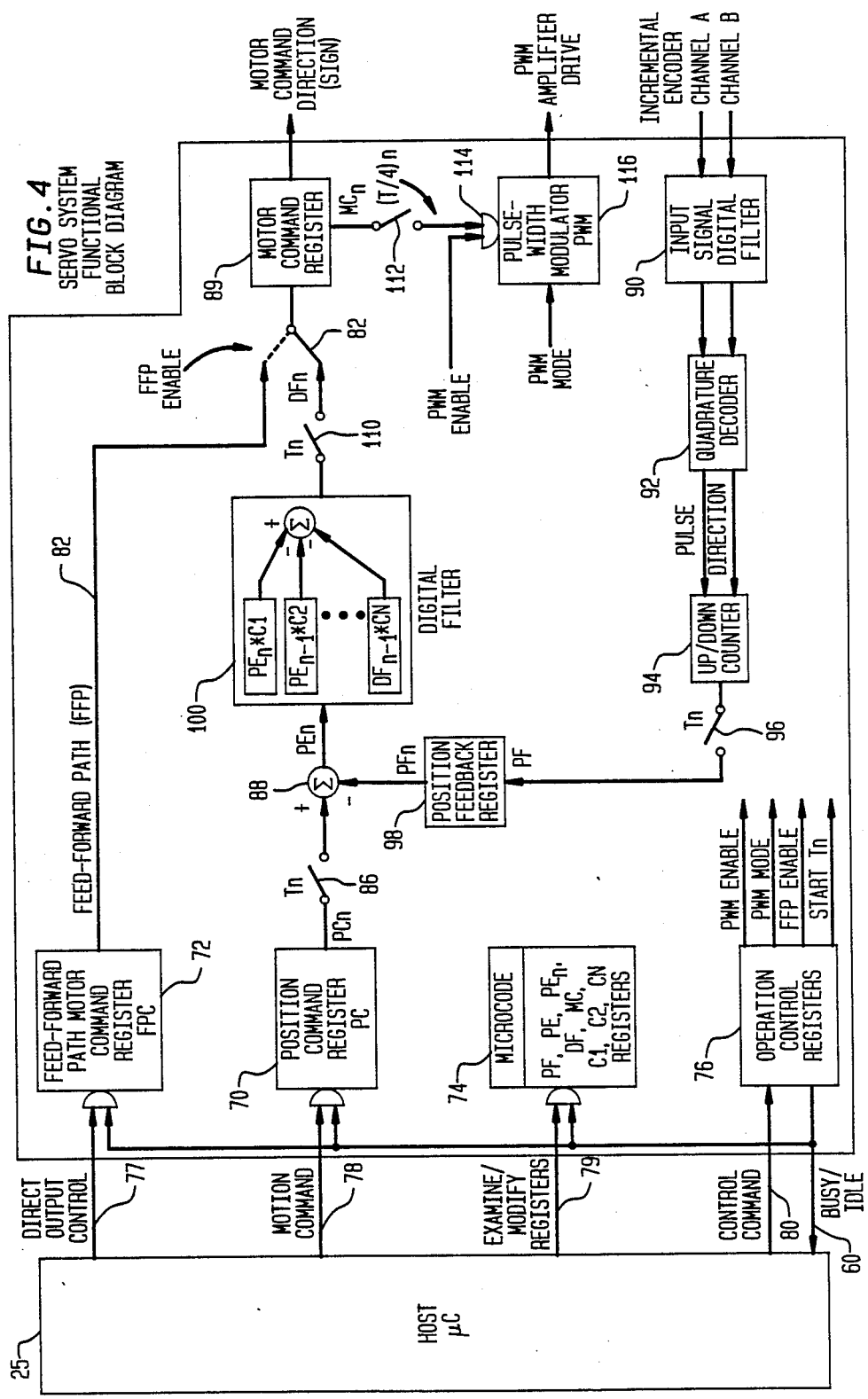
FIG. 4 SERVO SYSTEM FUNCTIONAL BLOCK DIAGRAM

MULTIPLE CHANNEL SERVO CONFIGURATION

BACKGROUND OF THE INVENTION

The present invention relates to digital servo systems and, more particularly, to multiple channel servo (MCS) systems utilizing an application specific integrated circuit (ASIC).

It is known to use microprocessor controllers for the real-time control of certain machine operations. To illustrate, a mail processing system may be comprised of a envelope feeder mechanism for receiving a stack of envelopes and, in a serial manner, serving up the envelope to a sealer-transport mechanism. The sealer-transport mechanism is charged with the function of sealing each envelope as it is caused to traverse a sealing apparatus and to serve-up the envelope to a mailing machine. It is known to also employ a scale mechanism located between the sealer-transport mechanism and the mailing machine. The scale mechanism is charged with the function of weighing the envelope by means of a scale, and determining the required postage value and communicating the postage value to a postage meter. In similar manner, a transport mechanism, customarily integral to the scale mechanism, must assume physical control over the envelope for positioning the envelope on the scale and thereafter serve-up the envelope to the mailing machine.

Generally, the mailing machine will include a transport mechanism which assumes control over the envelope and deliver the envelope to a printing station whereupon a postage meter will print a postage indicia on the envelope. The mailing machine transport mechanism will again assume control of the envelope and eject the envelope from the mailing machine.

In the afore-described mail processing system, envelopes are processed in a serial manner. In such mail processing systems, it is known to provide each of the cited mechanisms with a motor or plurality of motors to act as prime movers for the associated mechanisms. As is known, each motor or group of motors is under the control of a respective microprocessor motor controller acting through a respective driver board. It is also known to provide the respective driver board with a servo ASIC associated with each motor or group of motor requiring servo control.

Such mail processing systems as afore-described have required the use of multiple microprocessor motor controllers and associated servo ASIC's.

SUMMARY OF THE INVENTION

It is an object of the present invention to present a MCS ASIC operable with a motor controller system architected such that a single motor controller can servo control a plurality of motors.

It is a further object of the present invention to present a MCS ASIC operable under the direction of a motor controller for servo-controlling a plurality of motors whereby each of the controlled motors may be individually servo-controlled, the control algorithm for each motor can be independently changed on the fly and the servo-rate for each motor is independently selectable.

The MCS ASIC is a digital component designed to provide high-performance servo control for dc motors. It operates as a peripheral device under the control of a host microprocessor which in the preferred environment is a mailing system motor controller. The motor controller performs digital filtering for closed-loop compensation. The respective input channels of the MCS ASIC transforms the signals from a respective motor position encoder into a digital word through a quadrature decoder and up/down counter, and the respective output channels transforms the filter digital output into a pulse-width modulated (PWM) signal.

There are eight (8) pairs of input/output channels for supporting up to eight (8) servo loops, hence, eight (8) totally-separate motor control channels. The necessary digital logic and data processing for each of the servo systems are performed onboard the MSC ASIC relieving the motor controller software of the time-intensive tasks of digital control algorithm computations. Also the need for additional hardware components for I/O signal transformations is eliminated.

To start the motor control process, the motor controller is programmed to determine the motion profile for each motor and provide to the servo loops of the MCS ASIC with the desired motion commands which are discrete positions for a time interval T. The servo loops are initiated by a simply "start" command from the motor controller to the MCS ASIC. The periodic rate "T" at which the motor controller gives the position command to the respective loops tells the MCS ASIC to start determining the upper bandwidth limit of an individual servo control channel.

At any time before receiving the first start command, the MCS ASIC will allow the motor controller to download a sequence of coded-data that configures the respective servo channels to be enabled and configures the individual loop's control algorithm. In general, when not executing the motor control process, the MCS ASIC allows the motor controller to access its internal memory map through a data bus. As a result, for any servo channel enabled, the motor controller can download (or alter) and examine the filter algorithm coefficients, the filter output, the motor PWM command, and the motor position count.

The MSC ASIC contains an oscillator unit, a host bus interface, eight (8) separate pairs of I/O channels, and the control execution unit. The host bus interface unit allows the motor controller to access the internal memory of the chip and to start the motor control process. The MCS ASIC has only one control execution unit comprised of a microcode decoder and timing control logic, an address generator, a coefficient and data RAM, and an Arithmetic Logic UniT (ALU). To execute the digital control, the MCS ASIC invokes a data-driven logic that takes the coded-data (microcode) sequence from the RAM downloaded by the motor controller which when decoded defines the control algorithm steps for all the servo channels being used. The RAM also contains the control coefficients and computation data results.

BRIEF DESCRIPTION OF THE DRAWINGS

FIGS. 3a and 3b are timing diagrams for the motor controller software and MCS ASIC.

FIG. 4 is a functional block diagram of a MCS ASIC in accordance with the present invention.

DETAILED DESCRIPTION OF THE PREFERRED EMBODIMENT

Figure 1:
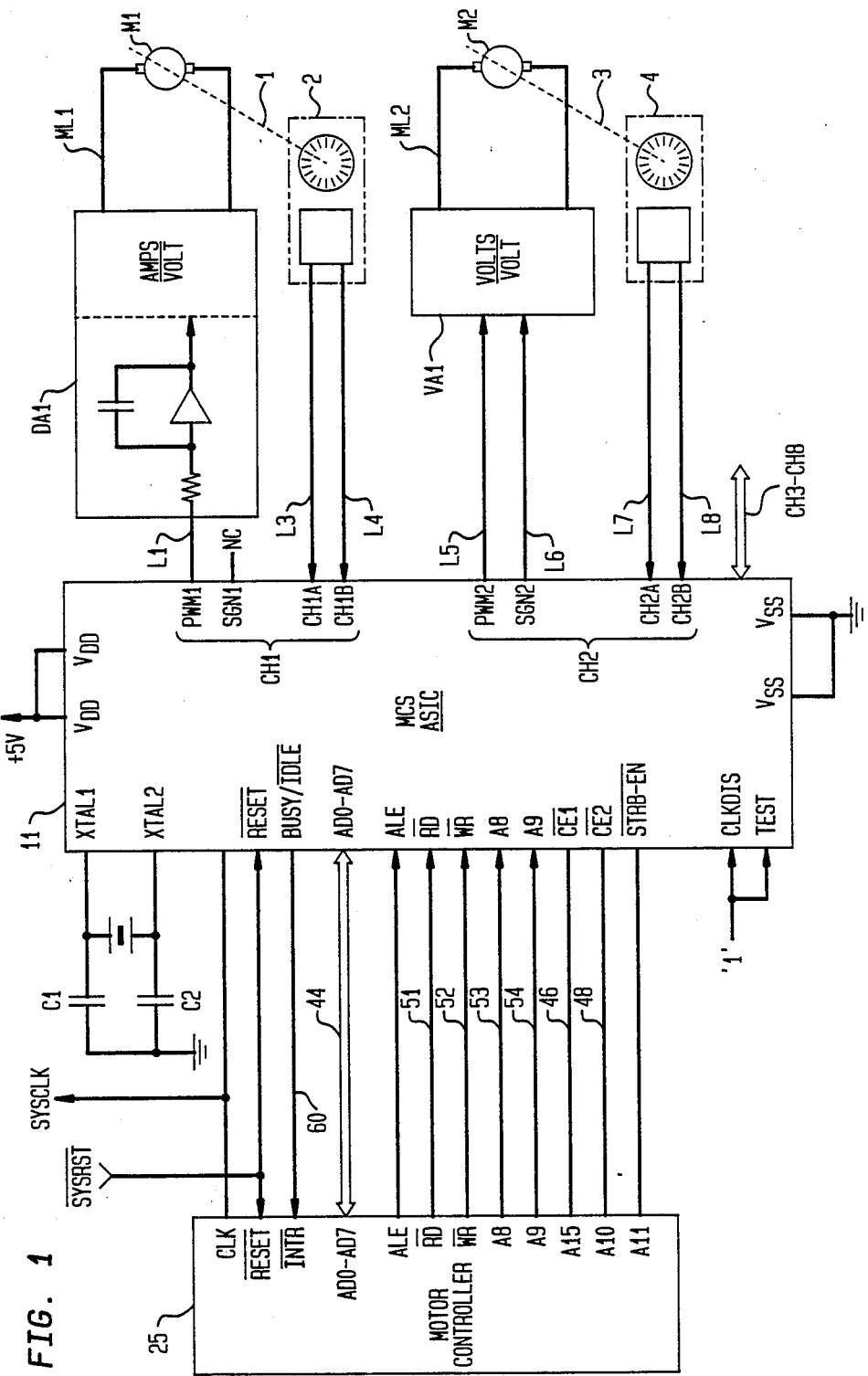
FIG. 1 is a diagram of MCS configuration in accordance with the present invention.

Referring to FIG. 1, the MCS ASIC, generally indicated as 11, is in bus communication with a host programmable microprocessor, generally indicated as 25. In the preferred embodiment, the MCS ASIC 11 has eight (8) Input/Output (I/O) channels, CH1 through CH2, respectively. It is noted that the only limitation to the number of channels is the number of available ASIC channel pins available.

Each of the I/O channels of the MCS ASIC includes a Pulse Width Modulation pin (PWM1 through PWM8) and a Motor Command Direction pin (SGN1 through SGN8) for signal output, and two input channel pins (CH1A through CH8A and CH1B through CH8B) for signal input. Each channel CH1 through CH2 can be associated with a particular motor for servo control of the respective motor. For example, channel CH1 may communicate with a motor M1 such that PWM1 is in line LI communication with the input side of a suitable current driver amplifier (DA1). The driver DA1 is in line ML1 communication with motor M1. When a current driver amplifier is used MCS ASIC pin SGN1 is not connected. The motor M1 output shaft, generally indicated as 1, is in direct communication with a suitable incremental shaft encoder, generally indicated as 2 in a suitable manner. The output of the encoder 2 is communicated to the MCS ASIC 11 through lines L3 and L4 to respective input pins CH1A and CH1B. Also, as is illustrated with respect to I/O channel CH2, pins PWM2 and SGN2 of the MCS ASIC 11 may be in line L5 and L6, respectively, communication with the input of a suitable voltage driver amplifier voltage amplifier VA1. The amplifier VA1 is in line ML2 with a motor M2. The motor M2 output shaft, generally indicated as 3, is in direct communication with a suitable incremental shaft encoder, generally indicated as 4 in a suitable manner. The remaining (six (6) motors, now shown, are in communication with respective channels CH3 through CH8 of the MCS ASIC 11 in like manner.

Figure 2:
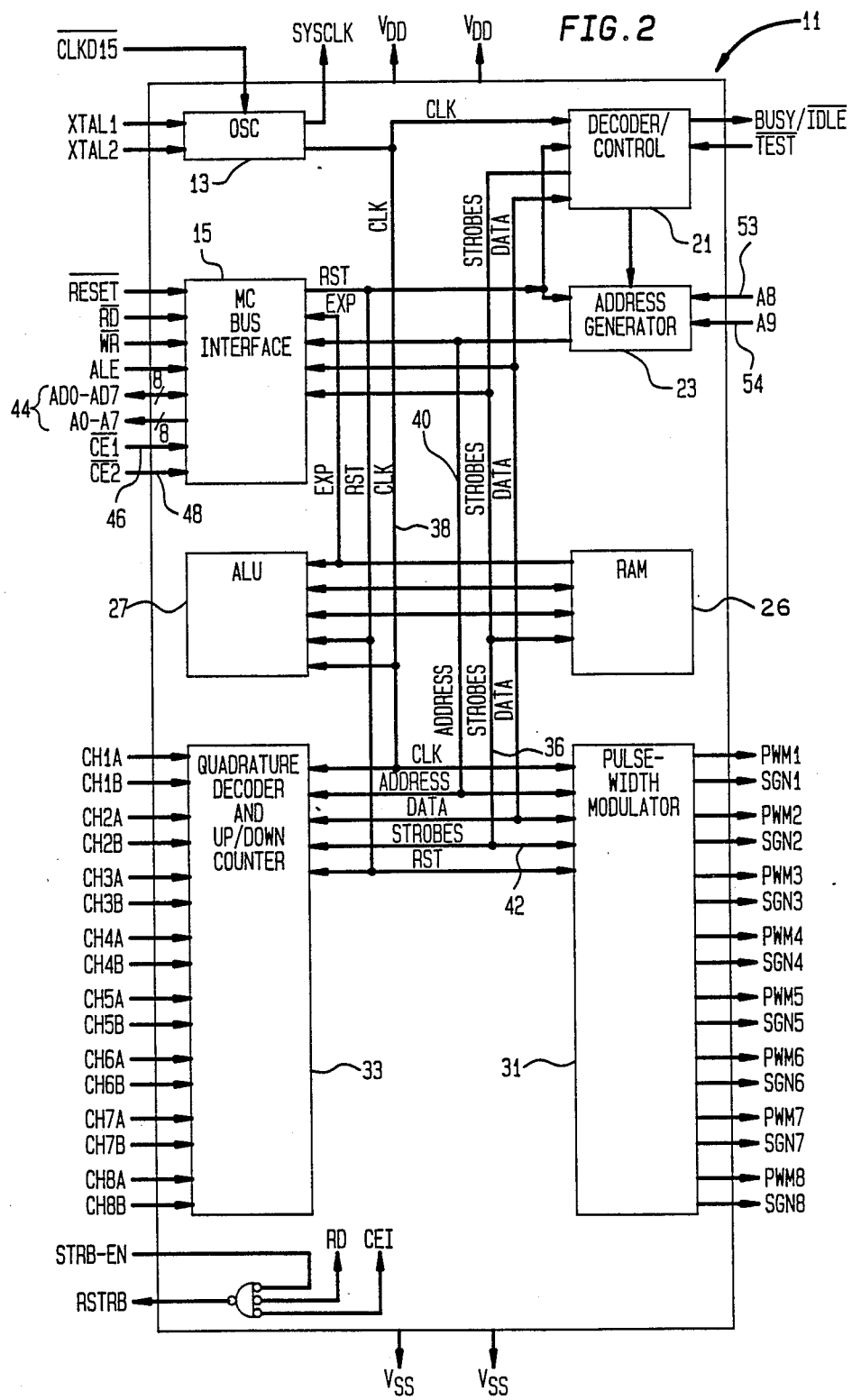
FIG. 2 is a block diagram of a MCS configuration in accordance with the present invention.

Referring to FIGS. 1 and 2, the MCS ASIC 11 contains an oscillator unit 13, MC bus interface 15, 8 I/O channels CH1 through CH8, respectively, and the control execution unit comprised of a Decoder/Control 21, Address Generator 23 and Multiplier Arithmetic-logic Unit (ALU) 27. The oscillator unit 13 takes a 12 MHz crystal signal input and derives from it the necessary clock requirement for the MCS ASIC 11. The MC bus interface unit 15 contains the digital logic that allows the motor controller 25 to access the internal memory of the MCS ASIC 11 and to start the motor control process. The MCS ASIC 11 can implement eight (8) servo controls simultaneously through its eight (8) separate I/O channels. The MCS ASIC 11 also contains a Pulse With Modulator Unit 31 and a Quadrature Decoder Unit 33 with up/down counter.

To execute the digital control, the MCS ASIC 11 invokes a data-driven logic that takes coded-data (microcode) sequence from the RAM 26 downloaded by the motor controller 25 which when decoded defines the control algorithm steps for all the servo channels being used. The RAM 26 also contains the control coefficients and computation data results. The ALU 27 performs the filter computation and features a 16×16 bit multiplier that produces a 32-bit product and a 32-bit accumulator to minimize the chance of overflow when summing the products. There is built-in logic for handling floating-point operands in twos-complement form. All of the logical elements are interconnected by a 16-bit data bus 36, an additional 4-bit negative exponent bus for floating-point data 38, an address bus 44 to index a fully-memory mapped system, and a control strobe bus 42.

The address generator 23 also contains the necessary logic to demultiplex the lower address and data from the motor controller bus 44 (AD0-AD7) with a standard Address Latch Enable (ALE) strobe signal. The demultiplexing time (ALE low to valid A0-A7) is 20 ns maximum. The demultiplexer outputs are made available to the motor controller 25 through the MC bus interface 15 pins A0-A7 through bus 44.

When the MCS ASIC 11 is not executing the control algorithm, the MCS ASIC 11 allows its RAM 26 to be fully memory-mapped into the motor controller address decoding system upon activation of enable strobes CE1 and CE2 by the motor controllr 25 through lines 46 and 48, respectively. At this time, the motor controller can access the MCS ASIC internal memory through its bus 44 using the RD and WR signal through lines 51 and 52, respectively, when CE1 and CE2 are both in "0" state. Lines 53 and 54 are provided to the MCS ASIC 11 in order to have up to 1 k bytes of memory. However, the MCS ASIC 11 internal control logic organizes the memory into 8-bit, 16-bit, and 20-bit words, depending on the data structure of the filter variables, when it executes the control algorithm. The data structure is determined in the hardware connection of all addressable elements in the MCS ASIC 11 to the internal data bus. Hence, the MCS ASIC 11 has a different internal memory map when accessed by the motor controller than when external bus access is allowed, i.e., all address are 8-bit wide. The bus control defaults to external access upon MC ASIC reset.

The dual bus control mechanism allows the motor controller to download the control algorithm microcode for all servo channels prior to issuing the first Start Command during a Servo Cycle, examine the microcode data to check for integrity, load and modify the desired Filter Coefficients (FC), examine the Position Feedback (PF) count value, enable the Feedforward-Path (FP) control and load the desired Motor Command (MC) value through the FP data, examine the filter input Position Error (PE) and the Digital Filter (DF) output, and commence the control algorithm execution with a Start Command (SC) (refer to FIG. 4).

The number of bytes the motor controller 25 accesses depends on the data structure of the above data, i.e., a filter coefficient is a three-byte access while a position command is only a 2-byte access.

Referring to FIGS. 3a, 3b, and 4, generally, the motor controller 25 performs a control cycle every 1 millisecond. In a manner more fully described, subsequently, during a control cycle "T" of the motor controller 25, the motor controller issues a start servo command at $T_s$ to the MCS ASIC 11 at which point communication between the motor controller 25 and the MCS ASIC 11 is inhibited. The MCS ASIC 11 then executes a servo loop with respect to each motor sequentially. After the MCS ASIC has performed the servo loops, the motor controller 25 can then access the internal memory of the MCS ASIC 11 in order to obtain the necessary information for determining the position command (PC) for each motor and downloading the PC's to the MCS ASIC 11 during cycle period "$T_d$".

The motor controller 25 issues two types of start commands at time "$T_s$", the Start-All Command (SC) and Start-Servo Command (SS). The Start-All Command (SC) signals the MCS ASIC 11 to start execution of the control algorithm for all the servo channels being used while the Start-Servo Command (SC) starts the execution of the control algorithm of the servo channels specified by the start at $T_s$ control byte. Upon detection of any start command, the MCS ASIC 11 enters a locked state by activating the BUSY output line 60.

The frequency at which the MCS ASIC 11 receives a start command determines the individual servo channel bandwidth. The servo channel bandwidth is determined by the following motor controller 25 maximum execution times:

- to implement the control algorithm of all servo channels (maximum of 400 us for 8 channels)
- to compute the postion commands of all servo channels for the next sampling instant Tn+1
- to download all position commands to the MCS ASIC
- to implement other system control tasks.

Since this is a digital control system, the motor controller 25 must generate the start command at a constant period, T, in each motor control cycle in order for the MCS ASIC's digital filter algorithm is to be valid for the motor control process.

The MCS ASIC 11 is permitted to communicate with the motor controller 25 at any time except when the BUSY output pin of the MCS ASIC 11 is activated, i.e., line 60 is activated by the MCS ASIC 11. The BUSY pin output is activated ("1" state) upon decoding a Start Command (SC or SS) from the motor controller 25. Activation of the BUSY pin indicates the MCS ASIC 11 is using its internal bus while executing the control algorithm. Any access attempted by the motor controller 25 to the internal memory while in the busy state is ignored by the MCS ASIC 11. After executing the control algorithm, line 60 is de-activated, the BUSY ("0" state) to indicate an idle status during which the motor controller 25 is allowed to access the MCS ASIC 11 internal memory.

The maximum time the MCS ASIC 11 is in the busy state after a Start-All Command (SC) is determined by the maximum execution time of an individual servo channel control algorithm multiplied by the number of servo channels being used. While the maximum time of the busy state after a Start-Servo Command (SC) is determined by the maximum execution time "$T_{sv}$" of the specified servo channel control algorithm.

Each of the channels, CH1 through CH2, operates in like manner as independent servo channels. Therefor, only one channel CH1 will be here described in detail. For the purpose of clarity, the functional operation of the MCS ASIC 11 channel CH1 will be described functionally with specific reference to the functional system elements illustrated in the functional diagram shown in FIG. 4.

Associated with each channel CH1 through CH8 is a position command (70) register, feed-forward path motor command (FPC) register 72, microcode registers 74 and operation control registers 76. The motor controller 25 communicates with the respective registers through lines 77 through 80 which lines are constituents of bus 44. As previously noted, line 60 is provided for informing the motor controller 25 whether the MCS ASIC is BUSY or IDLE. When line 60 is not enabled (IDLE) the registers 70, 72, 74 and 76 can be accessed by the motor controller 25 through respective lines 77, 78, 79 and 80.

The FPC register is in communication with a feed-forward enabling junction 82 by means of a feed-forward path (FFP) 82. The output of junction 82 is received by a motor command (MC) register 84.

The PC register 70 is in direct communication with an enabling junction 86. Output from the enabling junction 86 is directed to summing junction 88. Encoder 2 (ref. to FIG. 1) signals are filtered by a digital filter at function block 90. From function block 90, the encoder 2 signals are directed through the quadrature decoder 92 and up/down counter 94 to an enabling junction 96. Output from the enabling junction 96 is directed to a position feedback (PF) register 98 which is in direct communication with the summing junction 88.

The output from the summing junction 88 is representative of the position error and is directed to the function block 100 for digital filtering. The digital filter output from block 100 is directed to an enabling junction 110 and therefrom to the enabling junction 82. It should be appreciated by one skilled in the art that the tracking accuracy by filter equation can be improved by increasing the number of product terms with appropriate coefficients as a function of microcode instruction. By changing the microcode instruction, the number of product terms can be changed to more closely track the series of position commands (motion profile) from the motor controller 25. In the disabled state, junction 82 directs the digital filter output to the motor command (MC) register 84. Motor M1 direction commands (SGN) from the MC register 84, when appropriate, are directed to the motor driver amplifier (refer to FIG. 1, CH2). The MC register 89 directs a motor command to an enabling junction 112. The output from the enabling junction 122 is directed to a gate 114 to pulse width modulator (PWM) function block 116 (refer to FIG. 2, element 31). The output from the PWM function block is directed to the driver amplifier for the motor M1.

The outputs from the operation control register 76 are a PWM enabling signal directed to the gate 114, a PWM mode signal directed to the PWM function block 116 (mode operation of the PWM block 116 is subsequently described), a FFP enabling signal directed to enabling junction 82 and the start signal enabling to enabling junctions 86, 96 and 110. Enabling junction 112 is enabled by the motor controller Data Output (latch data) from MC register 84.

Referring to FIGS. 2 and 4, the Position Command (PC) generated by the motor controller 25 is a 2-byte integer downloaded from the motor controller to the MCS ASIC 11 for each servo channel CH1 through CH8 being used. The position commands (PC) generated by the motor controller represents the desired motion profile in discrete position per time interval T, where the position is in number of encoder counts and 1/T is the MCS ASIC 11's upper bandwidth limit. Hence, the PC is the position input to the servo channel. The channel PC input data stream determines how the respective motor M1 through M8 move, that is, a constant value for dPC/T/2 (rate of change in PC with respect to T square) defines the accel or deccel rate; a constant non-zero value for dPC/T defines the motion's constant velocity rate; and a zero value for dPC/t defines a steady-state (holding) mode.

The motor controller 25 downloads the PC input to the individual servo channel at a constant time period, T, in order for a sampled-data to be valid. Therefore, downloading the PCs for all servo channels precedes any start command, i.e., Start-all (SC) or Start-servo (SS). That is, each data stream of PC's downloaded by the motor controller 25 for the subsequent control cycle.

The Feedforward Path (FP) 82 control allows the motor controller 25 to bypass the control algorithm result, i.e., the digital filter output, and write its desired motor command value directly to the Motor Command (MC) register 84 of the output channel. A FP control byte is provided to the operation control register 76 for the control of each individual servo channel feedforward path (1 bit per channel). When the FFP junction 82 is enabled, the output channel of the corresponding servo is disconnected from the digital filter 100 and connected to its feedforward path. In this mode, the MCS ASIC 11 still continues to execute the control algorithm but the output channel's MC register 84 is not updated with the new filter output (DF) 100, but rather, updated with the value in the FP register 72 loaded by the motor controller 25 before the start command.

When the MCS ASIC 11 is BUSY, the new Motor Command (MC) is derived from the control algorithm result. The FP control is transparent to the control algorithm which simplifies the microcode design of the MCS ASIC 11.

The control algorithm is a sequence of coded-date instructions that the motor controller 25 downloads to the MSC ASIC 11's microcode memory area before any first start command, SC or SS, upon MCS ASIC 11 reset. Write-access to this area is inhibited after the first motor control process had begun, i.e., receipt of start command, to prevent inadvertent corruption of the data. The motor controller 25 may examine the microcode to check for data integrity during the not-busy state of the MCS ASIC 11. A soft Reset (RST) is necessary to re-download the microcode sequence.

The following discussion on the control algorithm assumes a minimum ALU design implementation of a single Multiplier/Accumulator Unit without a subtracter element. The control algorithm, in general, is a direct form realization of a digital filter with the following difference equation:

$$g(Tn) = \sum_{j=0}^{M} Aj * e(Tn - j) + \sum_{i=1}^{M} Bi * g(Tn - i)$$

The MCS ASIC 11 implements the above filter using the following data formats:
  g: 16-bit 2's complement (16 binary fractional places)
  A: 16-bit 2's complement (16 binary fractional places)
  e: 16-bit 2's complement (integer)
  B: 16-bit 2's complement (16 binary fractional places)
  M: 3 (total of 5 sum-of-product terms)

In particular, the control algorithm implements the lead-lag compensation for the digital servo system. Since the MCS ASIC 11 is fully memory-mapped internally and contains only one (1) Multiplier/Accumulator (M/A) in the ALU 27, the microcode instruction set is designed to move data between the RAM 26, Input/Output, 33 and 31, respectively, and the ALU 27. The sequence of the microcode instructions defines the control algorithm for the servo channel. An algorithm implementation using a single M/A without a subtracter is given by the following algorithm:

$$DF(Tn) = [C0*PC(Tn)] + [-C0*PF(Tn)] + [C1*PF(Tn-1)]$$

$$+ [-C1*PC(Tn-1)] + [C2*DF(Tn-1)]$$

$PC(Tn-1) = PC(Tn)$ $PF(Tn-1) = PF(Tn)$

IF Feedforward Path (FP) is enabled

THEN MC(Tn) = INTeger [ DF(Tn) ]

ELSE MC(Tn) =

NEXT SERVO CHANNEL where:
  DF(Tn)=digital filter output at present sampling instant
  DF(TN−1)=digital filter output at least sampling instant
  PC(Tn)=position command input at present sampling instant
  PC(Tn−1)=position command input at last sampling instant
  PF(Tn)=position feedback input at present sampling instant
  PF(Tn−1)=position feedback input at last sampling instant
  (MC(Tn)=motor command output at present sampling instant Relating the above algorithm to the general difference equation, the variable DF is the filter output g: C0 and C1 are the A coefficients; C2 is the B coefficient; and the term [PC(Tn-PC(Tn−1)3 is the e input. Therefore, DF, C0, C1, and C2 have a data structure of 16-bit mantissa in 2's complement form and a 4-bit negative exponent, i.e., a positive integer from 1 to 16 (0) indicating the number of binary places to the right of the radix point (fraction), while the inputs PC and PF have a 16-bit integer in 2's complement form data structure. The maximum value of the position feedback PF relative to the position command PC defines the maximum allowable position error e. Since the maximum e is dependent on the application, the motor controller 25 determines the absolute limit value, which must be less than 32 k (e is 16-bit 2's complement form), by examining the value of PF. The digital filter output DF mantissa is truncated to its lower byte and scaled by the output channel when transformed into the corresponding motor command (MC). Note that if the Feedforward Path (FP) control of the servo channel is enabled by the start command data, the control algorithm is transparent to it, i.e., hardware logic inhibits the loading of DF to MC.

The above algorithm requires five (5) multiplications. The following lead-lag algorithm form, $E(Tn) = [C0*PC(Tn)] + [-C0*PF(Tn)]$ $DF(Tn) = [C0*PC(Tn)] + [-C0*PF(Tn)] + [C1*E(Tn-1)]$ $+ \{ C3*DF(Tn-1) \}$ $E(Tn-1) = E(Tn)$ $MC(Tn) = INTeger [ DF(Tn) ]$ results with only four (4) multiplications where the variable E is a partial filter output, hence, has the same data format as DF, i.e., g. Also, C1 has the same format as C2, i.e., B.

The above algorithms assure that the Multiplier/Accumulator unit does not have a subtracter circuitry. Hence, the negative value of the coefficients are downloaded to the MCS ASIC 11 as well as their positive values so that the sum of products involving the positive and negative values of the coefficient produces the difference function, i.e., the term

[ C0*PC(Tn) ]+[ −C0*PF(Tn) ] is really

C0*[ PC(Tn)−PF(Tn) or C0*e(Tn) where e is the position error term.

It is noted that a subtracter element in the M/A unit directly computes the value of the position error, thus, simplifying the filter algorithm.

Each servo channel has its own I/O and RAM address, hence, if no control algorithm uses those addresses, then the corresponding servo channel is not being used. The maximum execution time for an individual servo channel control algorithm is 50 us. Therefore, if all eight (8) servo channels are being utilized, the maximum time for the MCS ASIC 11's motor control process is 400 us. The number of servo channels utilized and the time the motor controller 25 takes to issue any start command, SC or SS, determines the upper bandwidth limit of an individual servo channel when all are in steady-state mode, or, constant position command.

The microcode instruction set is designed to operate in the MCS ASIC's 11 fully memory-mapped internal architecture consisting of eight (8) separate pairs of I/O channels, a single Multiplier/Accumulator, and a single RAM area for data storage. MOVE and SHIFT commands are used in order to simplify the MCS ASIC 11's decoding and internal bus control logic.

The MOVE commands are used to transfer data between I/O, RAM, and Multiplier/Accumulator registers. Depending on the data structure, the data transfer may be 8-bit (for MC data), 16-bit (for PC and PF), or 20-bit (for DF and C0–C2) wide. Generally, in all MOVE instructions, the transferred data may be truncated if the destination word is smaller than the data, i.e., a 16-bit moved into an 8-bit register. Therefore, the specific address locations for these variables vary in width depending on the corresponding data structure and the connections of all addressable elements to the internal data bus determines the significant data. The upper or lower 16-bit of the 32-bit accumulator result and 4-bit exponent may be moved to any RAM or output channel address.

If a piece of data is already present in the data bus (placed by the source), a MOVE command may direct that data to more than one destination to facilitate transfer of same data from an input channel to an operand register and/or to a RAM location, or, from the accumulator to RAM, and/or to an output channel, and/or to an operand register.

The SHIFT commands are used to position the radix point of the 32-bit accumulator mantissa, i.e., increments or decrements the 4-bit exponent value, to move the significant value of the result into the accumulator's upper or lower 16-bit area.

A MOVE to the second operand register (20-bit wide) of the Multiplier/Accumulator starts the multiplication and summing process. A MOVE to a M/A Clear-Control register initializes all M/A 4-bit exponent registers to 0S, the 16-bit operand registers to 1s, and the 32-bit accumulator to 0. This prepares the M/A for the next servo channel control algorithm execution.

The process of multiplying two 16-bit operands and accumulating the product result is implemented by the Multiplier/Accumulator (M/A). The 16-bit multiplier produces a 32-bit product. A separate 32-bit accumulator sums the products and minimizes the chance of overflow during multi-cycle operations. The M/A operands and results data formats are both 16-bit mantissa in 2's complement form with a 4-bit negative exponent, i.e, a positive integer from 1 to 16 (0) to indicate the number of binary places to the right of the radix point (fraction). The 32-bit product's exponent value is automatically adjusted to 16 binary places, i.e., the 32-bit product is 16-bit integer and 16-bit fraction. Since the 32-bit accumulator sums the product, it has the same accuracy as the product term. To obtain the desired significant value of the accumulator result, i.e., convert to integer or 2 binary places, the whole 32-bit can be shifted left or right, incrementing or decrementig its exponent value, the number of times specified by the microcode instruction. Only the upper or lower 16-bit portion of the accumulator and its 4-bit exponent can be accessed through the microcode instruction.

The multiplication and summing process is started only by a microcode load instruction to an operand register of the M/A.

Referring to FIGS. 2 and 4, the output stage of each individual servo is a pulsed-width modulator (PWM) channel. The MCS ASIC 11 has eight (8) separate PWM output channels (PWM1 through PWM8). Each PWM channel contains an 8-bit latch, a free-wheeling counter, and a comparator circuit that compares the value of the latch and the counter in a conventional manner. The PWM output port is a logic 1 when the latch data is greater than the counter data; a logic 0 when the counter data is greater than the latch data.

Each PWM channel has two (2) mode of operation selectable by the microcode instruction that moves the filter output DF to the output channel. The first is the scaled mode (default). The Motor Command (MC) contains a 8-bit latch data. As the microcode instruction moves the lower 8-bit integer-part of the Digital Filter (DF) output to the PWM, the input latch circuitry automatically scales the data byte by adding 128, thus, scaling the MC value to ±127. Therefore, the PWM port is at 100% duty cycle when the latch holds full voltage in one direction; 50% when zero drive; and 0% when full voltage in opposite direction providing 128 discrete units of current value to each servo channel. In this mode, the PWM circut upon reset defaults to a 128 value in its MC latch. The second mode is the absolute mode where the sign (bit 7) of the 2's complement form filter output DF is placed at the SGN output of the PWM channel and the absolute value of DF is obtained and loaded into the motor command MC latch. Hence, in this mode, 0% duty-cycle when the latch holds zero drive and 100% duty cycle when full voltage at the direction defined by the SGN output.

The Motor Command (MC) latch is accessible to the motor controller 25 when the MCS ASIC 11 is in the idle state. If the Feedforward-Path (FP) control of the servo channel is enabled, the MCS ASIC 11 inhibits the loading of the DF output data to the MC latch, allowing the motor controller 25 computer to directly write its desired motor command value to the output channel (PWM) when the MCS ASIC 11 goes to idle state.

The input stage of each individual servo channel is a quadrature decoder and 16-bit up/down counter. The quadrature decoder samples the two quadrature signals from the shaft encoder. The 16-bit up/down counter counts every quadrature state transition-counting upwards when the channel "A" signal leads channel "B" signal, i.e., 90 electrical degrees out of phase between the two signals, and counting downwards when channel "A" lags channel "B". A 180 electrical degrees phase shift will result into an undefined incremental count, i.e., two (2) quadrature state transition. Input signal filtering is provided for each encoder channel to discriminate noise in the signal line.

The described MCS system has been described in its preferred embodiment within a preferred environment which description should not be viewed as limiting to the invention. The scope of the invention is set forth in the claims hereto.

What is claimed is:

1. A multiple channel servo system for engaging in bus communication with a micro-controller, motor driver means for driving a plurality of motors and motor servo informing means for providing servo information for selected ones of said motors, said micro-controller to generate respective motion command profile information for each of said selected motors, comprising:
   first means for receiving and storing said motion command profile information from said micro-controller for said selected motors;
   servo means for sequentially comparing said respective servo information with said respective motor command information and generating respective motor control information for said respective motor for causing said motor driver to cause said respective motor to closely track said respective motion command profile,
   said servo means having,
      second means for receiving and storing microcode for each said selected motors;
      an arithmetic logic unit (ALU) selectively configurable for said selected motors in accordance with said microcode such that said arithmetic logic unit can be reconfigured to sequentially generate respective motor control information for said selected motors.

2. A multiple channel servo system as claimed in claim 1, further comprising:
   channel means for providing a respective channel for each of said selected motors, each of said channels having input means for receiving said servo information for a respective one of said selected motors and output means for storing said motor control information for communication to said driver means on demand.

3. A multiple channel servo system as claimed in claim 1, whereby servo system executes a full servo loop to generate said motor control information for said selected motor channels in response to a start command from said micro-controller.

4. A multiple channel servo system as claimed in claim 3 further comprising means for changing said microcode subsequent to completion of a full servo loop and prior to receiving a new start command.

5. A multiple channel servo system for engaging in bus communication with a micro-controller, motor driver means for driving a plurality of motors and motor servo informing means for providing servo information for selected ones of said motors, said micro-controller to generate motor command profile information for said selected motors comprising:
   first means for receiving and storing said motor command profile information from said micro-controller for said selected motors;
   servo means for sequentially comparing said respective servo information with said respective motor command information and generating respective motor control information for said respective motor for causing said motor driver to cause said respective motor to closely track said respective motor command profile;
   second means for receiving and storing microcode for each said selected motors;
   an arithmetic logic unit (ALU) selectively configurable for said selected motors in accordance with said microcode such that said arithmetic logic unit can be configured to sequentially generate respective motor command information for said selected motors;
   channel means for providing a respective channel for each of said selected motors, each of said channels having input means for receiving said servo information for a respective one of said selected motors and output means for storing said motor control information for communication to said driver means on call;
   said multiple channel servo system to execute a full servo loop to generate said motor control information for said selected motor channels in response to a start command from said micro-controller; and,
   means for changing said microcode with respect to any of said channels subsequent to a servo execution and prior to receiving a new start command.

6. A multiple channel servo system as claimed in claim 5 further comprising said servo system being responsive to said start command in which said start command can specify which channels are to be servo executed.

7. A multiple channel servo system as claimed in claim 5 further comprising means for changing said microcode subsequent to completion of a full servo loop and prior to receiving a new start command.

8. A multiple channel servo system as claimed in claims 1 or 5, having by-pass means for bypassing said servo means to cause said motor command to create corresponding motor control commands.

9. A motor control system having:
   motor driver means having a plurality of channels for independently driving a respective motor in response to a respective pulse width modulated signal;
   motor servo informing means for independently providing servo information for respective ones of said motors;
   a micro-controller for generating respective motion command profile information for selected ones of said motors;
   servo means for sequentially comparing said respective servo information with said respective motion command information and generating a respective pulse width modulated signal for causing said motor driver to cause said respective motor to closely track said respective motor command profile having first means for receiving and storing said motion command profile information from said micro-controller for said selected motors;

second means for receiving and storing microcode for each said selected motors;

an arithmetic logic unit (ALU) selectively configurable for said selected motors in accordance with said microcode such that said arithmetic logic unit can be reconfigured to sequentially generate respective motor command information for said selected motors;

modulation means responsive to said motor command information for respectively generating a representative pulse width signal representative of said motor command;

channel means for providing a respective channel for each of said selected motors, each of said channels having input means for receiving said servo information for a respective one of said selected motors and output means for transmitting said respective pulse width modulated signal;

communication means for providing bus communication between micro-controller, said driver, said servo information means and said servo means.

10. A multiple channel servo system as claimed in claim 9 further comprising said servo system being responsive to said start command in which said start command can specify which channels are to be servo executed.

11. A multiple channel servo system as claimed in claim 9 having by-pass means responsive to a operation control command from said micro-controller for said selected channel to cause modulation means to create pulse width modulated signal directly corresponding motion commands.

12. A multiple channel servo system as claimed in claim 9 further comprising means for changing said microcode subsequent to completion of a full servo loop and prior to receiving a new start command.

* * * * *